Figure 1:
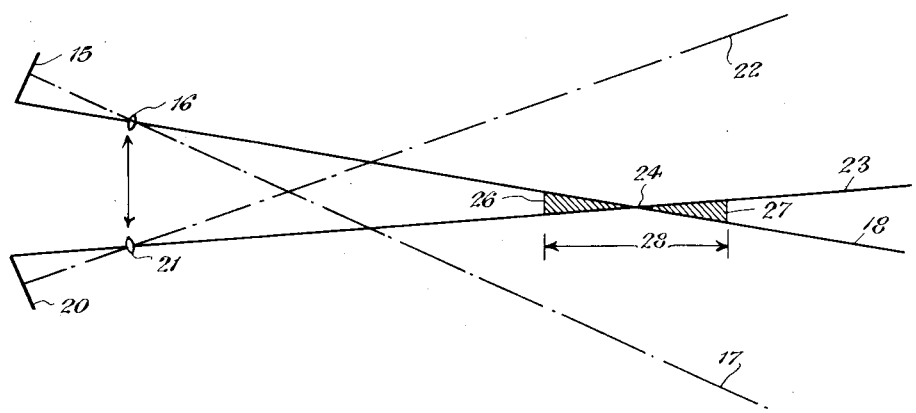

Jan. 22, 1952  F. WALLER ET AL  2,583,030
PARALLAX CORRECTION FOR MULTILENS CAMERAS
Filed Oct. 9, 1948  5 Sheets-Sheet 1

INVENTORS
Fred Waller
Richard C. Babish
BY Emery Varney
Whittemore & Dix
ATTORNEYS

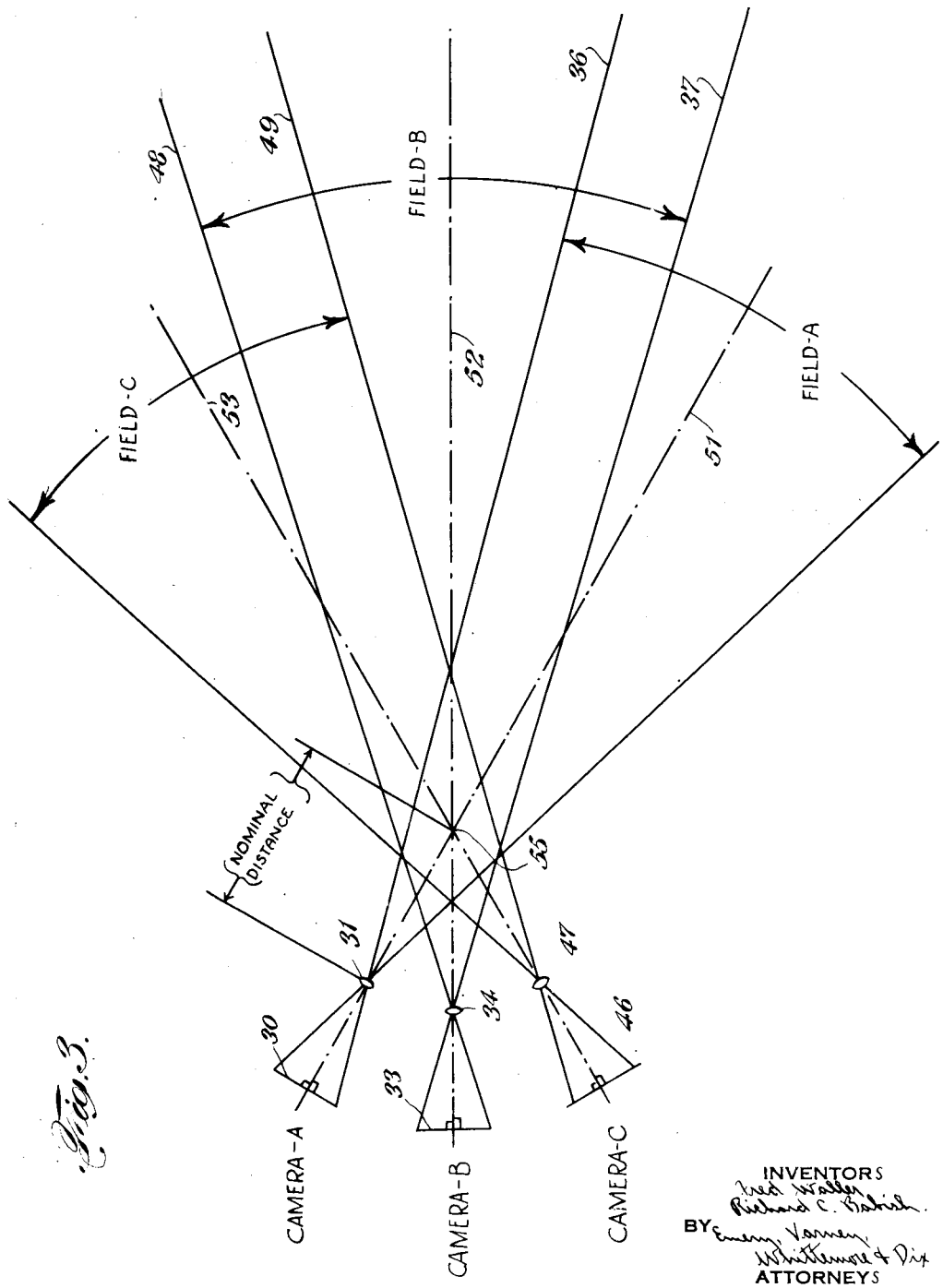

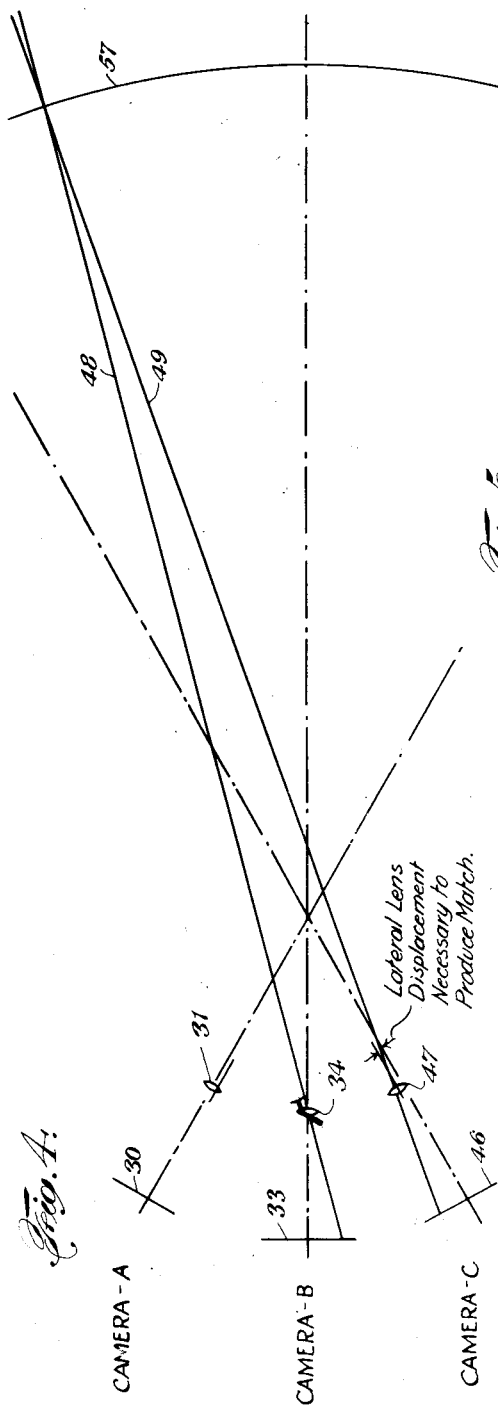
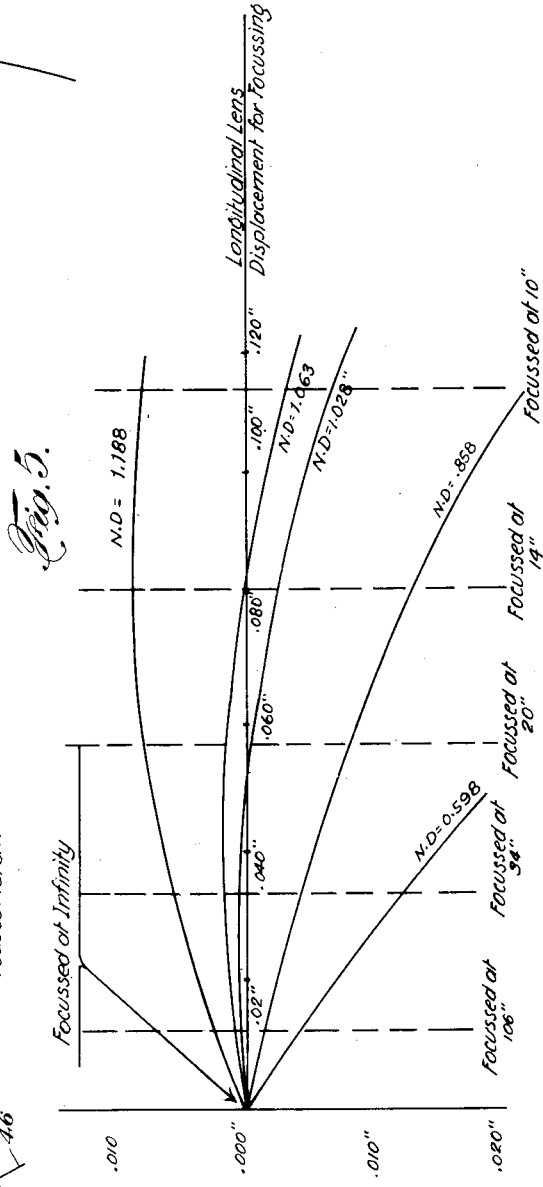

Jan. 22, 1952  F. WALLER ET AL  2,583,030
PARALLAX CORRECTION FOR MULTILENS CAMERAS
Filed Oct. 9, 1948  5 Sheets-Sheet 4

INVENTORS
Fred Waller
Richard C. Babish
BY
Emery Varney
Whittemore & Dix
ATTORNEYS Jan. 22, 1952 F. WALLER ET AL 2,583,030
PARALLAX CORRECTION FOR MULTILENS CAMERAS
Filed Oct. 9, 1948 5 Sheets-Sheet 5
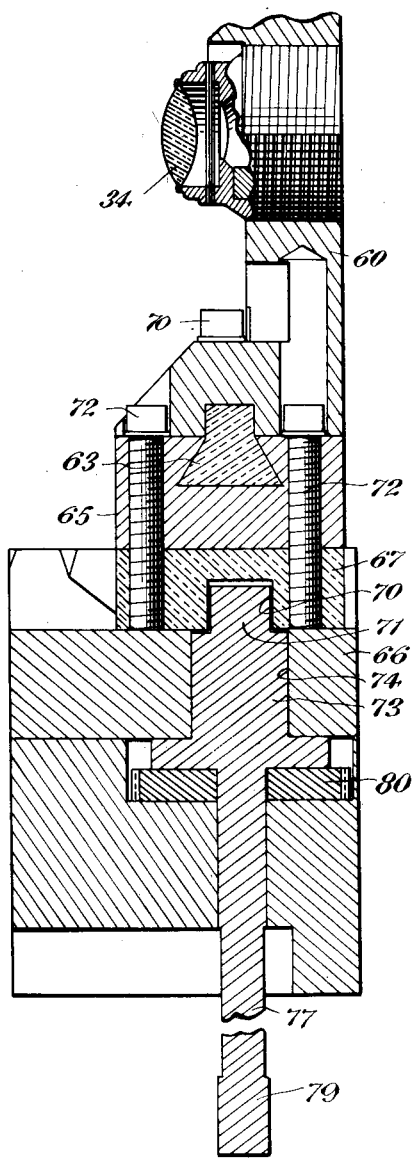
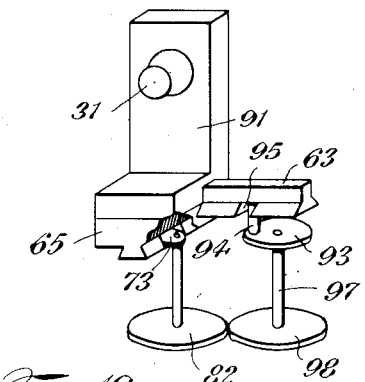
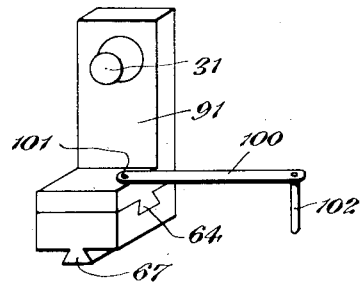
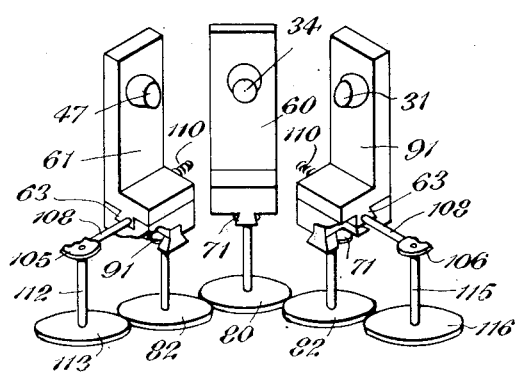
INVENTORS
Fred Waller
Richard C. Babish
BY Emery Varney,
Whittemore & Dix
ATTORNEYS Patented Jan. 22, 1952

2,583,030

UNITED STATES PATENT OFFICE 2,583,030

PARALLAX CORRECTION FOR MULTILENS CAMERAS

Fred Waller and Richard C. Babish, Huntington, N. Y., assignors to The Vitarama Corporation, Huntington Station, N. Y., a corporation of New York Application October 9, 1948, Serial No. 53,732

6 Claims. (Cl. 95—18)

This invention relates to multi-camera structures for taking pictures that are to be projected as individual images of a mosaic picture, and the invention relates more particularly to the elimination of mismatching at the edges of adjacent pictures.

In making mosaic pictures, the width of the frame is considered a fixed dimension to avoid projection difficulties. In the multi-camera structure with which the pictures are taken, the fact that the lenses are not optically coincident causes them to see slightly different views of objects near the boundaries of the individual pictures. Objects closer than a certain critical object distance will have some parts doubled while objects farther away will have some parts omitted. The amount of doubling or omission depends on the object distance, the critical distance and the optical separation of the lenses.

The closer the lenses are placed together, the greater becomes the object distances over which the mismatching of the image is within tolerable limits. For theatrical use it is necessary to be able to focus sharply on the object of greatest interest. It is also necessary that the subject in focus be perfectly matched.

One object of this invention is to provide improved apparatus for taking mosaic pictures and for eliminating or greatly reducing mismatching at the edges of the individual pictures used to make the mosaic.

It is another object of this invention to provide a multi-camera structure in which the lenses are placed so closely to one another, and the various geometrical constants of the camera system are so selected, that mismatching is reduced to a minimum and kept within tolerable limits over a greater range of object distances than has been possible with mosaic picture cameras of the prior art.

Still another object of the invention is to provide a multi-camera structure for taking mosaic pictures with focusing lenses, and for moving certain parts of the camera structure with respect to other parts automatically in response to focus changes and in directions that compensate for the parallax errors, induced by the changes in focus. By compensating for these parallax errors, perfect matching of the picture edges can be obtained for objects on which the lenses are focused.

Certain features of the invention relate to mechanical constructions for obtaining relative movement of the camera parts to compensate for the parallax errors, and for obtaining such movement with simple and inexpensive mechanism.

Other objects, features and advantages of the invention will appear or be pointed out as the description proceeds.

Figure 2:
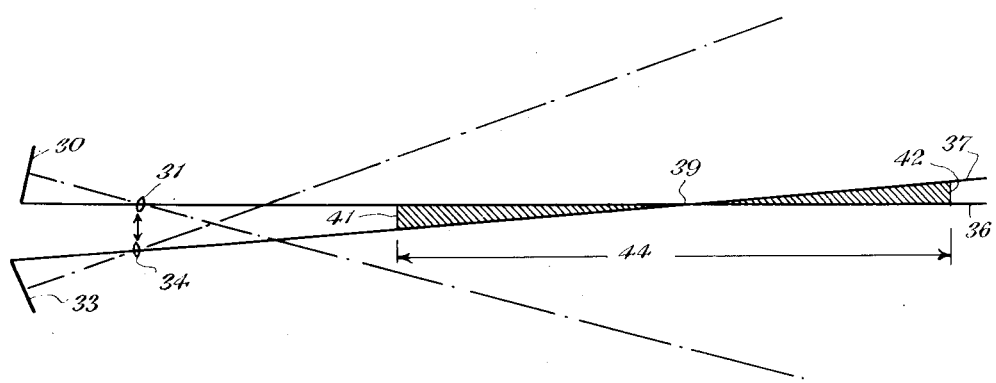

In the drawing forming a part hereof, in which like reference characters indicate corresponding parts in all the views, Figures 1 and 2 are diagrams showing the effect of lens separation on the mismatching of the edge portions of individual units of a mosaic picture, Figure 3 is a diagram showing the location of cameras for taking mosaic pictures and illustrating certain geometrical constants of the camera system, Figure 4 is a diagram showing the effect of the change in focus on the fields covered by the cameras shown in Figure 3, Figure 5 is a graph illustrating the effect of changes in certain constants upon the degree of correction required to compensate for parallax errors at different focal distances.

Figure 6:
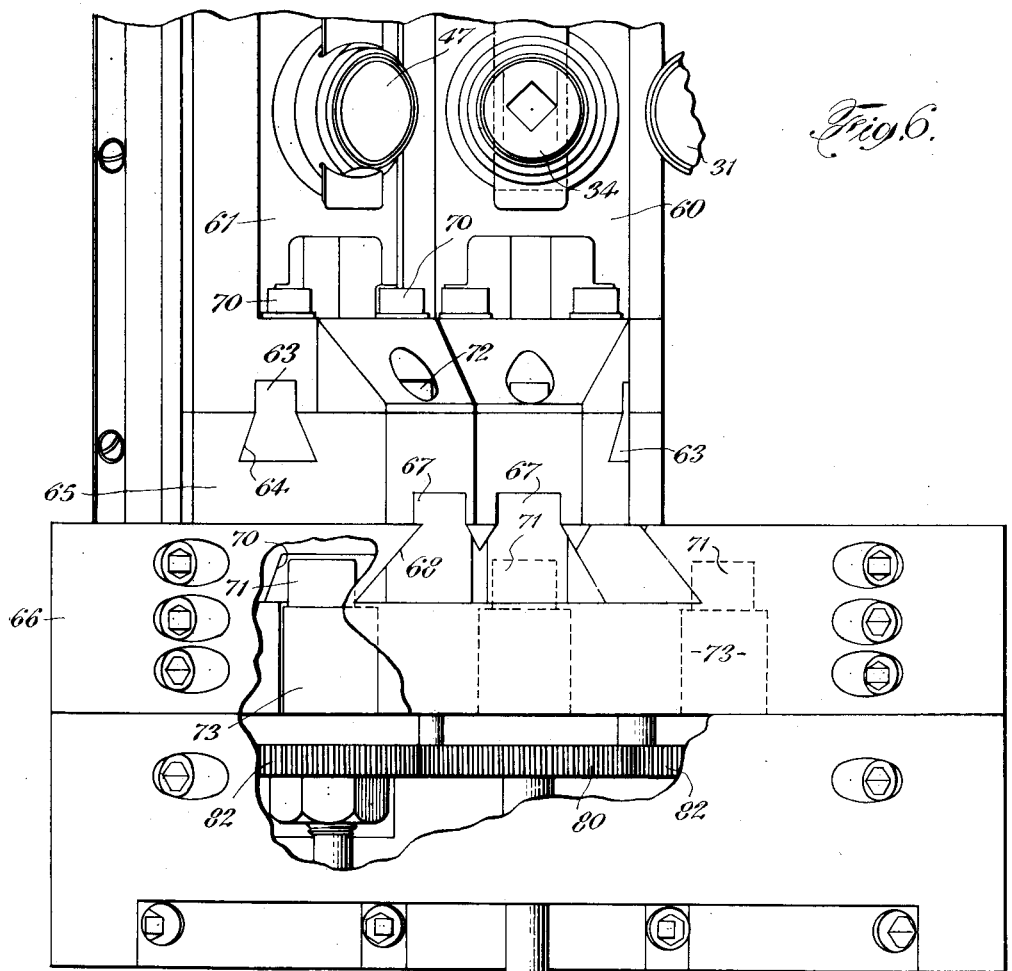
Figure 7:
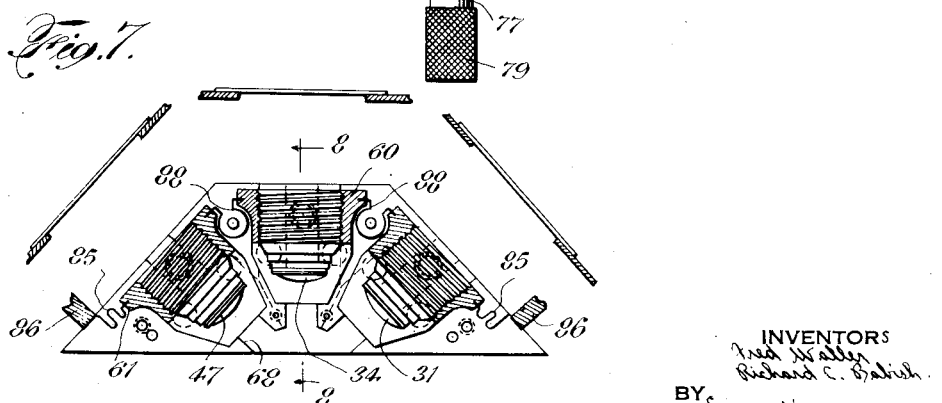

Figure 6 is a fragmentary view, partly broken away, showing the front of a multi-camera structure embodying this invention, Figure 7 is a top plan view, partly diagrammatic and partly in section, showing the multi-camera structure of Figure 6, Figure 8 is a sectional view taken along the lines 8—8 of Figure 7, Figures 9, 10 and 11 are diagrammatic views showing different mechanisms for producing transverse lens movement in response to focusing movement of the lens.

Figure 1 shows a camera represented by a film 15 and a lens 16. A perpendicular to the center of the film is represented by the dot and dash line 17, and the one edge of the field of exposure is represented by the line 18. A second camera is represented by a film 20 and a lens 21. A perpendicular to the center of the film 20 is shown as a dot and dash line 22, and the edge of the field of exposure of the film 20, which must match the adjacent edge of the picture on the film 15, is represented by a line 23.

The lines 18 and 23 cross at a point 24. It will be apparent that objects between the lines 18 and 23, and nearer to the cameras than the point 24, will be photographed by both cameras, and will be duplicated in a mosaic picture. Objects between the lines 18 and 23 and further from the cameras than the point 24 will not be photographed by either camera, and will, therefore, be omitted entirely from a mosaic picture made up of the individual pictures taken on the films 15 and 20. The range of object distances within which the mismatch of the pictures can be considered tolerable extends from a line 26 to a line 27, and this range of object distances is represented by the dimension arrow 28.

Figure 2 shows a camera represented by a film 30 and lens 31 used in conjunction with another camera represented by a film 33 and a lens 34 for taking mosaic pictures. The cameras in Figure 2 have their lenses 31 and 34 located much closer together than are the lenses 16 and 21 of the cameras shown in Figure 1. The matching edges of the pictures taken on the films 30 and 33 are represented by lines 36 and 37 respectively. The object distance at which perfect matching of the picture fields is obtained is located at the point 38, and the range in which the mismatching of the pictures is within tolerable limits extends from a line 41 to a line 42. This range of object distances is equal to the length of the dimension arrow 44, which is considerably longer than the corresponding dimension arrow 28 of Figure 1. In Figures 1 and 2 the focus of the cameras is considered to be fixed.

Figure 3 shows the cameras with lenses 31 and 34 used in combination with another camera represented by a film 46 and a lens 47. The cameras having the lenses 31, 34 and 47 are designated in Figure 3 as cameras A, B, and C respectively, and the fields covered by these cameras are designated as fields A, B, and C, respectively. When the cameras are focused for infinity, the adjacent edges of the fields A and B overlap and the lines 36 and 37, representing the adjacent edges of these fields, converge at infinity. A similar relationship exists between the fields B and C. The adjacent edges of these fields B and C are represented by lines 48 and 49 respectively, and these lines converge at infinity.

Perpendiculars 51, 52 and 53 from the centers of the films 30, 33 and 46, respectively, intersect at a point 55. The point 55 is the "cross-over point" of the camera system as shown in Figure 3. The "nominal distance" of the system is the distance from the first principal point of each of the lenses to the cross-over point 55 when the lenses are focused at infinity. Since the lenses 31, 34, and 47 are matched lenses, the nominal distance is the same regardless of which lens is used for the measurement.

Figure 4 shows the lenses 31, 34 and 47 of the cameras A, B and C focused for an object in the field represented by the line 57. With the lenses thus focused the lines 48 and 49 converge at a point on the line 57 so as to obtain perfect matching of all objects that are in exact focus. Other lines representing the adjacent edges of the fields of cameras A and B will likewise converge at the line 57.

When the multi-camera system of Figure 4 is to be focused on an object at some distance from the cameras other than the distance to the line 57, the lenses 31, 34 and 47 are moved toward or from their films 30, 33 and 46, respectively, and this movement is made simultaneously for all lenses, by means of a common control operating through motion transmitting connections that will be described in connection with other figures of the drawing. For the present, it is sufficient to understand that the lenses 31, 34 and 47 are moved simultaneously to focus on objects at any desired distance while maintaining all of the lenses 31, 34 and 47 at the same focus with respect to one another. Such changes in focus produce parallax errors that cause mismatching of the images at the focus distances unless the lens, or film, or both, of one camera is moved with respect to the next camera to correct for the parallax error.

There are a number of ways in which such corrections can be effected. One is by rotating the cameras so that the cross-over point is closer to or further from the cameras. Another way is to move the film and lens transversely with respect to one another, either by moving the film while the lens remains stationary or by moving the lens while the film remains fixed. It will be understood that such correcting movements can be made in all of the cameras, but it is most practical to leave the center camera in a fixed position and to make the necessary movements with the two side cameras to bring the system into the correlation that produces matching of the adjacent edges of the different pictures at the particular object distance for which the cameras are focused.

Figure 5 illustrates the amount of transverse movement required to correct parallax errors and obtain perfect matching for objects in focus when the lenses are focused for various object distances. The amount of transverse movement required for the correction is a function of the focal length of the lens, the width of the picture, the nominal distance and the distance to the object photographed. The graph shown in Figure 5 was made for a lens having a focal length of 27 millimeters.

It will be apparent from Figure 5 that if the nominal distance is so chosen with respect to other constants of the system, the amount of correction required can be reduced to a very low value, as in the case of the nominal distance 1.063 inches. Extremely small correction is required over the range from 20 inches to infinity with a nominal distance of 1.028 inches for the camera system represented by Figure 5.

If the multi-camera structure is to be used for taking mosaic pictures with object distances that are never closer than approximately 20 inches, and the geometrical constants of Figure 5, with a nominal distance of 1.028 inches are used, no correction for parallax errors is required unless extremely accurate matching of the picture edges is necessary.

Figure 6 shows the mechanical construction of the preferred embodiment of the invention. The lens 34 is carried by a lens support 60, and the lens 47 is carried by a lens support 61. This lens support 61 has a gibbed slide 63 which fits into a dovetail groove 64 in a slide block 65 which rests on a base 66. The slide block 65 has a gibbed slide 67 which fits into a dovetail groove 68 in the base 66. Similar dovetail grooves in the base 66 for slide blocks of the other lens supports come together at the front of the camera structure. The gibbed slide 63 is connected to the lens support by screws 70; and the gibbed slide 67 is connected to the base 66 by screws 72. Corresponding slides and blocks for focusing and transversely adjusting all of the lens supports are indicated by the same reference characters.

The lens support 61 has transverse movement when the gibbed slide 63 moves along the dovetail groove 64, and has a movement perpendicular to the film when the gibbed slide 67 moves along the dovetail groove 68. This latter movement is used for focusing the lens 47, whereas the transverse movement along the groove 64 is used for correcting parallax errors. It should be understood that "transverse movement" referred to herein is not to be limited to movement in a plane at right angles to the optical axis of the lens, but any movement that shifts the lens support or the film holder sideways, with respect to the optical axis of the lens, is to be considered "transverse."

In the bottom surface of each of the slides 67 there is a recess 70 into which an eccentric 71 extends. Each of the eccentrics is connected to the upper end of a hub 73 which turns in a bearing 74 in the base 66.

A shaft 77 extends downward from the center hub 73 and there is a knob 79 at the lower end of the shaft 77 for turning the shaft manually. A gear 80 attached to the lower end of the middle hub 73 meshes with other gears 82 connected with the lower ends of the side hubs 73. Rotation of the knob 79 causes the center gear 80 to turn and rotate the side gears 82 through the same angles as the knob 79 is turned. These gears turn the eccentrics 73 and shift the slide blocks 67 of all of the lens supports through equal distances to change the object distances for which the lenses are focused.

It is not necessary to provide for any sidewise movement of the center lens support 60. This lens support is provided with a gibbed slide 63, however, in order to have standardized construction for all three of the lens supports, and to provide for initial adjustment of the center lens, though this could be obtained in other ways. The lens supports for each of the side lenses, including the lens 47, are provided with means for shifting them transversely along the dovetail grooves at the same time that these lens supports are moved to focus their lenses. One way in which this can be done is by making the groove 68 extend in a direction that is not parallel to the axis of the lens 47 located above it.

When this expedient is used, the groove 68 is made to extend in a direction that has a small component transverse of the direction in which the lens support moves to change the lens focus. This component of transverse direction is on the side to which the lens must be moved to correct for parallax error induced by the change in focus. The results obtained are only approximate because the transverse movement required for different focuses is not a straight line relationship as will be apparent by reference to Figure 5. Since the groove 68 must be a straight line, the transverse component of its direction is chosen so as to obtain sideways movement represented by a straight line most nearly approximating the theoretical curve, such as shown in Figure 5 for the geometrical and optical constants of the particular lens and camera system for which the groove is designed.

Figure 7 is a sectional view showing the relationship of the individual cameras in the multi-camera structure shown in Figures 6 and 8. This view shows particularly the relationship of the groove 68 along which the lens support 61 is moved to focus the camera. Figure 7 also shows flexible bellows 85 connecting the outside lens supports and the sides 86 of the camera housing, and also shows flexible bellows 88 between the center lens support 60 and the lens supports on either side of it.

The mounts of the lenses 31, 34 and 47 are shaped to permit the lenses to be brought very close together when the cameras are adjusted to focus on objects close to them. The distance between the lenses with this construction is less than the diameter of one of the lenses, and with such close spacing of the lenses much wider latitude and better results are obtained as previously explained in comparing Figures 1 and 2.

Figures 9, 10 and 11 show mechanical means for shifting the lens supports transversely in a definite coordination with the focusing movement.

Figure 9 shows a lens support 91 for the lens 31. This lens support has its gibbed slide 63 extending over a disc 93 from which a crank 94 extends upward into a slot 95 in the underside of the gibbed slide 63.

The disc 93 is integrally connected with a shaft 97 that is rotated by a gear 98. This gear 98 meshes with the gear 82 that turns the eccentric 73 by which the slide block 65 of the lens support 91 is moved toward and from the film to focus the lens 31.

By designing the mechanism so as to use the most advantageous section of the angular movement of the crank 94, the lens support 91 can be made to move sideways along a curve closely approximating the theoretical curves corresponding to those shown in Figure 5.

Figure 10 shows another and a more simplified mechanism for moving the lens support 91 sideways. In this construction a link 100 is connected to the lens support 91 by a pin 101. The other end of the link 100 is attached to a stud 102 at a fixed location on the camera structure. The link 100 extends at an acute angle to the direction in which the lens support 91 moves as the gibbed slide 67 is shifted along its dovetail slot to change the focus. Because of the acute angle of the link 100 it pulls the lens support 91 transversely along the dovetail groove 64 to a definite transverse displacement corresponding to the longitudinal displacement for each change in the focus.

Figure 11 shows still another modified construction for moving the side lenses 31 and 47 transversely in synchronism with the simultaneous longitudinal displacement on all of the lenses when focusing the multi-camera structure. The lenses 31, 34 and 47 are focused by means of the eccentrics 71 rotated by the gears 80 and 82, as previously explained. No transverse movement is imparted to the support 60 of the lens 34, but the lens supports 61 and 91 are moved transversely by cams 105 and 106. Studs 108, extending from the gibbed slides 63 of the lens supports 61 and 91, serve as the cam followers for the cams 105 and 106. Grooved or double acting cams can be used if desired, but the simple cams 105 and 106 are sufficient with springs 110 to give the lens supports and cam followers 108 a bias toward the cams 105 and 106.

The cam 105 is connected with a shaft 112 that is rotated by a gear 113 which meshes with one of the gears 82. The cam 106 is rotated by a shaft 115 connected to a gear 116 that meshes with and is driven by the other gear 82 of the camera focusing mechanism.

The preferred embodiments of this invention have been illustrated and described, but changes and modifications can be made and some features of the invention can be used alone or in different combinations without departing from the invention as defined in the claims.

What is claimed is:

1. A multi-camera structure for exposing films to be used in making mosaic pictures, said structure comprising a first and a second lens support for holding lenses that expose separate film frame areas, the supports holding the lenses in such positions that they form on said different film frame areas the images of different fields with the fields matching along adjacent edge zones of the film frame areas, a guide for each lens support along which the lens support is movable in the direction of the optical axis of the lens to focus the lens for objects at different distances from the camera structure, and a second and transverse guide for at least the second of the lens supports and along which the second lens support is movable transversely of the optical axis of its lens, a focusing control, and motion transmitting connections operated by the focusing control for moving the second lens support along both guides simultaneously with the direction of movement of the lens support along the transverse guide coordinated with the change in focus resulting from movement along the first guide to maintain the match of the field images for all focuses and all changes of field angle with change of focus.

2. In a multi-camera structure a film holder, a lens support in front of the film holder, a crank, a second film holder and a second lens support, one of which is connected with the crank and movable transversely by the crank, the lens supports being angularly related to one another so that lenses in the supports have their optical axes converging in front of the camera structure at such a sharp angle that the lenses view different fields which meet along a match line located at a substantial distance from the camera structure, a separate device for moving the respective lens supports toward and from their film holders, and a common controller that moves both of said devices and a crank simultaneously, the crank being so oriented that it causes a relative movement which shifts the match line of the fields toward and from the camera structure in the same direction as the changes in focal distance.

3. In a multi-camera structure for taking mosaic pictures, film holders for separate films, lens supports in front of the respective film holders, said lens supports being in angular relation to one another and in position to hold lenses that have their optical axes converging in front of the camera structure at such a sharp angle that the lenses in the holders view different fields that meet along a match line, guides along which the lens supports are movable toward and from their respective film holders, bearing means on which at least one of the lens supports is movable transversely of its direction of movement toward and from its film holder, apparatus for moving the lens supports simultaneously to change the focus of lenses carried by said supports while maintaining the lenses in both supports at the same focus with respect to one another, link means connected with at least one of the lens supports and extending at an acute angle to the direction of the extent of the guide along which that lens support moves so that said link moves the lens support transversely as the lens support is shifted to change its focus, the length and angle of the link being so correlated with the focal length of the lens that the direction and rate of transverse movement of the lens support shifts the match line toward and from the camera structure in the same direction as the changes in focal distance.

4. A multi-camera structure for taking mosaic pictures, said structure comprising in combination, three separate film holders, a base located in front of the film holders, a separate lens support located in front of each of the film holders including a center lens support and two side lens supports, a slide block under each of the lens supports, a gibbed connection between each of said side lens supports and its underlying slide block, said gibbed connection extending transversely, other gibbed connections by which the lens supports and their slide blocks are connected with the base, said other gibbed connections extending in directions substantially parallel to the optical axes of the lenses carried by their associated lens supports, an eccentric for moving each of the lens supports along its gibbed connection with the base, gearing connecting all of the eccentrics together, a common control for rotating the gearing to operate the eccentrics and shift the lens supports simultaneously along their gibbed connections with the base when focusing the lenses, flexible bellows connections extending between adjacent sides of the lens supports between the outside edges of the said lens supports and a fixed housing of the camera structure, and mechanism responsive to the operation of said control for moving at least two of said lens supports on their transverse gibbed connections to their slide blocks in direction to compensate for parallax errors induced by changes in the focus of the lenses.

5. A multi-camera structure for exposing films to be used in making mosaic pictures, said structure comprising a first and a second lens support for holding lenses that expose separate film frame areas, the supports holding the lenses in such positions that they form on said different film frame areas the images of different fields with the fields matching along adjacent edge zones of the film frame areas, separate bearings on which the respective lens supports are movable to focus the lenses carried by said lens supports, and other bearings on which at least the second of the lens supports is movable transversely with respect to the optical axis of the lens in the first lens support while normal to the plane of the film that is exposed by the lens in the second lens support, a focusing control and motion transmitting connections that are operated by the focusing control to move the lens supports simultaneously to focus and at the same time move at least the second lens support on said other bearings, said motion transmitting connections including a device that coordinates the movements of the lens supports on said separate bearings with the movement on said other bearings to maintain the match for the field images for all focuses and all changes of the field angle with change of focus.

6. The multi-camera structure described in claim 5 and in which the motion transmitting connections include a cam that moves at least the second lens support on said other bearings, and in which the cam has a displacement that compensates for changes in the field angle with change of focus.

FRED WALLER.
RICHARD C. BABISH.

REFERENCES CITED

The following references are of record in the file of this patent:

UNITED STATES PATENTS

| Number | Name | Date |
| --- | --- | --- |
| 1,599,400 | Bagley | Oct. 27, 1925 |
| 1,833,668 | Beidler | Nov. 24, 1931 |
| 2,003,754 | Miller | June 4, 1935 |
| 2,036,062 | Lutz | Mar. 31, 1936 |
| 2,298,586 | Phillips | Oct. 13, 1942 |
| 2,365,212 | Oriol | Dec. 19, 1944 |